G. GLAUDEL.

WINDSHIELD ATTACHMENT.

APPLICATION FILED JULY 14, 1921.

Reissued Aug. 22, 1922.

15,433.

INVENTOR.

GEORGE GLAUDEL

BY Hazard & Miller

ATTORNEYS.

UNITED STATES PATENT OFFICE.

GEORGE GLAUDEL, OF LOS ANGELES, CALIFORNIA, ASSIGNOR OF ONE-HALF TO GEORGE L. MITCHELL, OF SANTA MONICA, CALIFORNIA.

WINDSHIELD ATTACHMENT.

15,433. Specification of Reissued Letters Patent. Reissued Aug. 22, 1922.

Original No. 1,346,402, dated July 13, 1920, Serial No. 298,184, filed May 19, 1919. Application for reissue filed July 14, 1921. Serial No. 484,779.

*To all whom it may concern:*

Be it known that I, GEORGE GLAUDEL, a citizen of France, residing at Los Angeles, in the county of Los Angeles and State of California, have invented new and useful Improvements in Windshield Attachments, of which the following is a specification.

This invention relates to a wind deflector attachment for wind shields and particularly pertains to a means for effecting engagement between a supporting bracket and a wind deflector plate.

It is the object of this invention to provide a device of the above character by which formation of openings in the wind deflector plate is obviated, and whereby the use of bolts or other fastenings passing through the deflector plate may be dispensed with.

Another object is to provide a clamp for connecting the wind deflector plate to a supporting bracket by means of which the plate may be readily mounted and removed.

Other objects will appear hereinafter.

The invention is illustrated in the accompanying drawings, in which.

Figure 1:
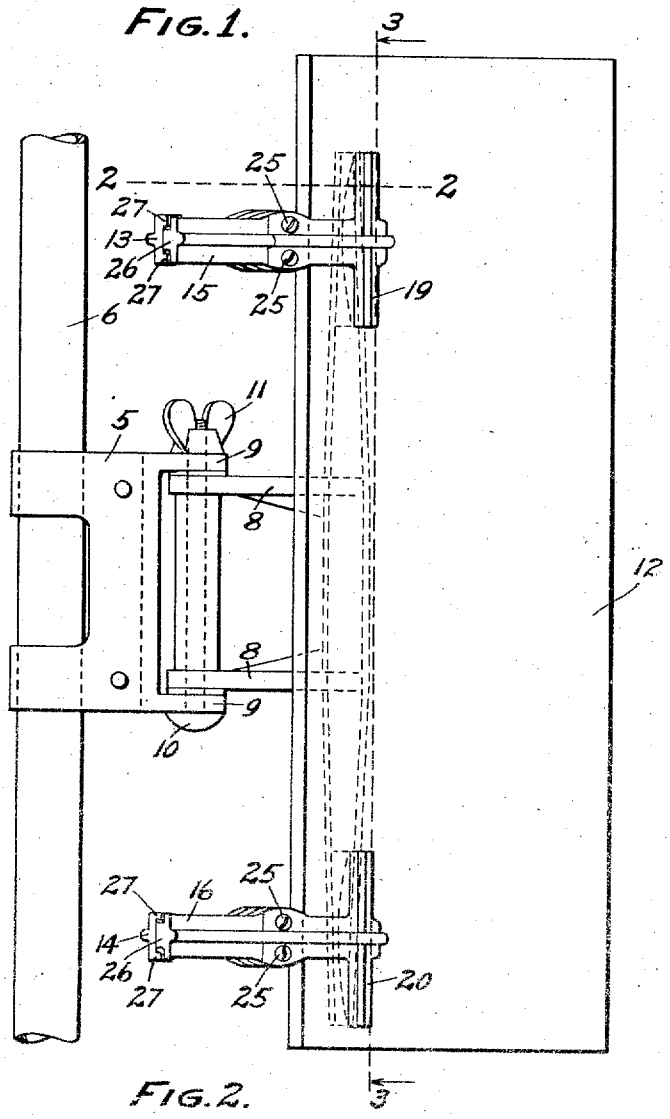
Figure 1 is a view showing the wind deflector plate, supporting bracket, and plate clamping device in front elevation.

More specifically, 5 indicates a clamp adapted to engage the side member 6 of a wind shield frame and on which clamp a vertically extending bracket 7 is pivoted for angular adjustment. The connection between the bracket and the clamp is here shown as comprising a pair of spaced projections 8 on the bracket 7 which extend between the projections 9 on the clamp 5 and engaged therewith by a bolt 10 fitted with a wing nut 11 for holding the bracket against movement in various adjusted positions.

The essence of the present invention resides in a means for attaching a wind deflector plate 12, preferably formed of plate glass, to the vertical bracket 7. This means embodies a pair of spaced horizontally extending arms 13 and 14 projecting rigidly from the bracket 7 adjacent to its ends, and clamping members 15 and 16 carried by said arms.

Figure 3:
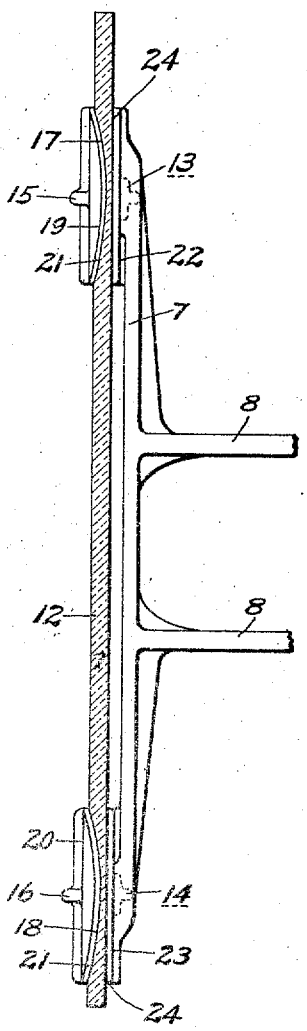
Fig. 3 is a view in vertical section and elevation as seen on the line 3—3 of Fig. 1 in the direction indicated by the arrows.
Figure 2:
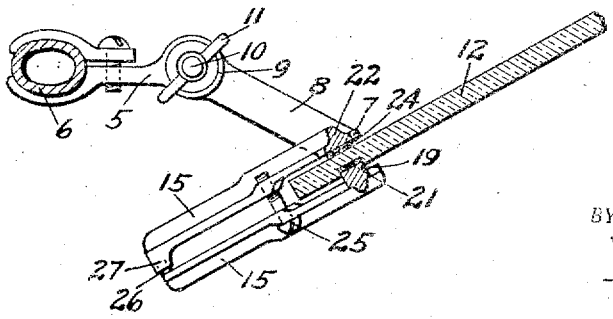
Fig. 2 is a horizontal section and plan view as seen on the line 2—2 of Fig. 1.

In carrying out the invention the wind deflector plate is formed on its outer face with a pair of spaced arcuate channels 17 and 18 extending parallel with and adjacent to one of its vertical edges, and clamping members 15 and 16 are formed with transversely extending arcuate end members 19 and 20 adapted to project into the channels 18 and 17, as shown in Fig. 3; pads 21 of rubber or similar material being interposed between the arcuate faces of the end members 19 and 20 and the channels 17 and 18. The bracket 7 is formed with bosses 22 and 23 at its end portions extending opposite the end members 19 and 20 and against which the portions of the deflector plate 12 rearward of the channels 17 and 18 bears when the plate 12 is clamped in position on the bracket 7. Cushion members 24 formed of rubber or similar material are interposed between the bosses 22 and 23 and the rear face of the plate 12.

As a means for clamping the plate 12 between the bosses 22 and 23 and the arcuate end members 19 and 20 screws 25 are passed through the clamping members 15 and 16 and threaded into engagement with the arms 13 and 14; the outer ends of the clamping members 15 and 16 being formed with inturned flanges 26 to bear on the end portions of the arms 13 and 14 between spaced flanges 27 to form a slidable and pivoted connection between the clamping members 15 and 16 and their co-operating arms 13 and 14. The clamping members 15 and 16 and arms 13 and 14 are thus spaced from each other to permit the opposite ends of the clamping members 15 and 16 being brought into tight engagement with the plate 12 on tightening the screws 25.

The operation of the invention is apparent from the foregoing, it being seen that the plate 12 may be readily put in place and removed by adjustment of the screws 25 to tighten or loosen the clamping members 15 and 16 as may be required. By this construction boring of holes through the glass plate and a consequent weakening thereof is obviated and a stronger and more secure engagement effected between the plate and bracket than is ordinarily possible where bolts or similar fastenings are passed through openings in the plate.

I claim:

1. In a wind deflector attachment for wind shields, a wind deflecting plate formed with channels having arcuate bottom walls, a bracket formed with bosses arranged to bear on said plate opposite said channels, and clamping members carried by said bracket formed with arcuate end portions adapted to seat in said channels.

2. In a wind deflector attachment for wind shields, a wind deflecting plate formed with channels having arcuate bottom walls extending longitudinally of the plate adjacent to one edge thereof, a vertical bracket having bosses adapted to bear on said plate rearward of said channels, laterally extending arms rigid on said bracket, and clamping members adjustably connected to said arms arranged to extend over the edge of said wind deflecting plate formed with arcuate end portions adapted to seat in the aforesaid channels.

3. In a wind deflector attachment for wind shields, a vertical bracket, means for attaching said bracket to a wind shield frame, a pair of horizontally extending arms on said bracket, a clamping member pivotally and slidably carried by each of said arms, screw means connecting said clamping members to said arms intermediate the ends thereof, transverse arcuate members on said clamping members, and a wind deflecting plate formed with channels having arcuate bottom walls adapted to receive the arcuate portions of said clamping members.

4. In a wind deflector attachment for wind shields, a wind-deflecting plate, a bracket, a boss on said bracket arranged to bear against one side of said plate, a fixed arm on said bracket extending beyond one edge of said plate, a clamping bar adapted to extend opposite said fixed arm having its outer end seated on said fixed arm, and screw means connecting said clamping member to said arm for advancing the inner end of the clamping member, whereby the deflector plate may be engaged between the clamping member and the boss on the fixed arm.

5. In a wind deflector for wind shields, a wind-deflecting plate formed with channels spaced apart, a bracket bearing on said plate opposite said channels, and clamping members carried by said bracket which clamping members are seated in said channels.

6. In a wind deflector for wind shields, a wind-deflecting plate formed with channels, a vertical bracket adapted to bear on said plate rearward of said channels, laterally-extending arms on said bracket, and clamping members adjustably connected to said arms arranged to extend over the edge of said plate and adapted to seat in said channels.

7. In a wind deflector for wind shields, a wind-deflecting plate, a bracket bearing against one side of said plate, a fixed arm on said bracket extending beyond one edge of said plate, a clamping bar extending opposite said fixed arm having its outer end pivoted on said fixed arm, and means for advancing the inner end of the clamping bar, whereby the said plate may be firmly held between the clamping bar and said bracket.

8. In a wind deflector for windshields, a wind deflecting plate, a bracket bearing against one side of said plate, a fixed arm on said bracket extending beyond one edge of said plate, a clamping bar engaging the other side of said plate and opposite to said bracket, said clamping bar being pivoted on said fixed arm, and means for moving the inner end of the clamping bar toward said bracket whereby the said plate may be firmly held between the clamping bar and said bracket.

In witness whereof, I have hereunto set my hand this 20th day of June, 1921.

GEO. GLAUDEL.